(12) United States Patent
Birkestrand

(10) Patent No.: US 8,074,223 B2
(45) Date of Patent: Dec. 6, 2011

(54) PERMANENTLY ACTIVATING RESOURCES BASED ON PREVIOUS TEMPORARY RESOURCE USAGE

(75) Inventor: Daniel Charles Birkestrand, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1908 days.

(21) Appl. No.: 11/047,531

(22) Filed: Jan. 31, 2005

(65) Prior Publication Data

US 2006/0174007 A1 Aug. 3, 2006

(51) Int. Cl.
*G06F 9/46* (2006.01)
*G06Q 10/00* (2006.01)

(52) U.S. Cl. ........................................ 718/104; 705/1.1
(58) Field of Classification Search .................. 718/104; 705/1.1
See application file for complete search history.

(56) References Cited

U.S. PATENT DOCUMENTS

| | | | |
|---|---|---|---|
| 5,579,222 A | 11/1996 | Bains et al. | |
| 5,717,604 A | 2/1998 | Wiggins | |
| 5,745,879 A | 4/1998 | Wyman | |
| 5,949,876 A | 9/1999 | Ginter et al. | |
| 5,951,633 A * | 9/1999 | Polcyn | 718/104 |
| 5,956,505 A * | 9/1999 | Manduley | 713/1 |
| 6,012,032 A | 1/2000 | Donovan et al. | |
| 6,058,423 A | 5/2000 | Factor | |
| 6,061,504 A | 5/2000 | Tzelnic et al. | |
| 6,061,732 A | 5/2000 | Korst et al. | |
| 6,086,618 A | 7/2000 | Al-Hilali et al. | |
| 6,230,200 B1 | 5/2001 | Forecast et al. | |

(Continued)

FOREIGN PATENT DOCUMENTS

JP 2001-331333 11/2001

(Continued)

OTHER PUBLICATIONS

HP Istant Capacity on Demand Program for NonStop Servers, Frequently Asked Questions Hewlett-Packard Development Company, Mar. 2003.*

(Continued)

*Primary Examiner* — Meng A An
*Assistant Examiner* — Mengyao Zhe
(74) *Attorney, Agent, or Firm* — Owen J. Gamon

(57) ABSTRACT

A method, apparatus, system, and signal-bearing medium that, in an embodiment, determine whether an amount of usage of a resource, which is used under a temporary usage plan, exceeds a threshold. If that determination is true, a quantity of the resource is calculated and that quantity is converted from the temporary usage plan to a permanent usage plan, without further charge to the customer. In another embodiment, a different resource may be converted to the permanent usage plan than the resource that was temporarily used. In various embodiments, the calculation of the quantity is made based on an attribute of the computer that uses the resource or based on an activation code received from the provider of the resource. In various embodiments, the amount of the usage is either a time amount of use or a monetary amount charged for the resource under the temporary usage plan. In various embodiments, the quantity of the resource converted is based on a ratio of a number of permanent resources in use to a total number of resources, based on an attribute of the computer, based on the cost of the computer, based on the age of the computer, based on a speed of the resource, or based on the amount of resources in the computer.

15 Claims, 4 Drawing Sheets

U.S. PATENT DOCUMENTS

| | | | |
|---|---|---|---|
| 6,301,616 | B1 | 10/2001 | Pal et al. |
| 6,385,651 | B2 | 5/2002 | Dancs et al. |
| 6,460,082 | B1 | 10/2002 | Lumelsky et al. |
| 6,584,489 | B1 | 6/2003 | Jones et al. |
| 6,625,750 | B1 | 9/2003 | Duso et al. |
| 6,832,230 | B1 * | 12/2004 | Zilliacus et al. ........... 455/414.3 |
| 6,931,640 | B2 | 8/2005 | Asano et al. |
| 7,013,296 | B1 | 3/2006 | Yemini et al. |
| 7,020,161 | B1 | 3/2006 | Eberle et al. |
| 7,032,241 | B1 | 4/2006 | Venkatachary et al. |
| 7,039,784 | B1 | 5/2006 | Chen et al. |
| 7,124,098 | B2 * | 10/2006 | Hopson et al. .................. 705/26 |
| 7,136,800 | B1 | 11/2006 | Vega |
| 7,146,496 | B2 | 12/2006 | Circenis et al. |
| 7,155,735 | B1 | 12/2006 | Ngo et al. |
| 7,322,034 | B2 | 1/2008 | Crawford, Jr. et al. |
| 7,447,764 | B2 | 11/2008 | Guillemin |
| 2001/0025249 | A1 | 9/2001 | Tokunaga |
| 2002/0013802 | A1 | 1/2002 | Mori et al. |
| 2002/0016842 | A1 | 2/2002 | Eki |
| 2002/0124168 | A1 | 9/2002 | McCown et al. |
| 2002/0156824 | A1 | 10/2002 | Armstrong et al. |
| 2002/0161891 | A1 | 10/2002 | Higuchi et al. |
| 2002/0166117 | A1 | 11/2002 | Abrams et al. |
| 2002/0169725 | A1 | 11/2002 | Eng |
| 2002/0178206 | A1 | 11/2002 | Smith |
| 2002/0178387 | A1 | 11/2002 | Theron |
| 2003/0018870 | A1 | 1/2003 | Abboud et al. |
| 2003/0028653 | A1 | 2/2003 | New, Jr. et al. |
| 2003/0036918 | A1 | 2/2003 | Pintsov |
| 2003/0093528 | A1 | 5/2003 | Rolia |
| 2003/0135580 | A1 | 7/2003 | Camble et al. |
| 2004/0088412 | A1 | 5/2004 | John et al. |
| 2004/0103064 | A1 | 5/2004 | Howard et al. |
| 2004/0111308 | A1 | 6/2004 | Yakov |
| 2004/0148511 | A1 | 7/2004 | Circenis et al. |
| 2004/0194089 | A1 | 9/2004 | McCarthy et al. |
| 2004/0199473 | A1 | 10/2004 | Birkestrand et al. |
| 2004/0199632 | A1 | 10/2004 | Romero et al. |
| 2004/0215748 | A1 | 10/2004 | Boonie et al. |
| 2004/0220878 | A1 * | 11/2004 | Lao et al. .......... 705/51 |
| 2004/0236852 | A1 | 11/2004 | Birkestrand et al. |
| 2004/0255048 | A1 | 12/2004 | Lev Ran et al. |
| 2005/0015343 | A1 | 1/2005 | Nagai et al. |
| 2005/0049973 | A1 | 3/2005 | Read e al. |
| 2005/0246705 | A1 | 11/2005 | Etelson et al. |
| 2005/0268063 | A1 | 12/2005 | Diao et al. |
| 2006/0100962 | A1 | 5/2006 | Wooldridge et al. |
| 2006/0190615 | A1 | 8/2006 | Panwar et al. |
| 2006/0294238 | A1 | 12/2006 | Naik et al. |

FOREIGN PATENT DOCUMENTS

| | | |
|---|---|---|
| JP | 2002-024192 | 1/2002 |
| TW | 439031 A4 | 6/2001 |
| WO | WO 02086698 | 10/2002 |

OTHER PUBLICATIONS

Capacity On Demand for HP NonStop S-series Servers Hewlett-Packard Company, Aug. 2002.*

Friedmann, "Wie gut sind Capacity-on-Demand-Angebote?" Feb. 13, 2003, pp. 1-6.

iSeries Model 840 Manual, "V5R1 Planning Guide for Capacity Upgrade on Demand," Oct. 10, 2001, pp. 1-29.

iSeries Model 830 Manual, "V5R1 Planning Guide for Capacity Upgrade on Demand," Oct. 10, 2001, pp. 1-30.

IBM eServer iSeries 400 Presentation, "Capacity Upgrade on Demand," Oct. 3, 2000.

Katharina Friedmann, "How good are Capacity-on-Demand Offers?", www.Computerwoche.de, Feb. 2, 2003.

Sugerman et al., "Virtualizing I/O Devices on VMware Workstation's Hosted Virtual Machine Monitor," Proceedings of the 2001 USENIX Annual Technical Conference.

Figueiredo et al., "A Case For Grid Computing On Virtual Machines," May 2003.

* cited by examiner

PERMANENTLY ACTIVATING RESOURCES BASED ON PREVIOUS TEMPORARY RESOURCE USAGE

CROSS-REFERENCE TO RELATED APPLICATIONS

The present application is related to commonly-assigned patent application Ser. No. 10/406,652, to Daniel Birkestrand et al., filed Apr. 3, 2003, entitled "Method to Provide On-Demand Resource Access," which is herein incorporated by reference. The present application is also related to commonly-assigned patent application Ser. No. 10/616,676, now U.S. Pat. No. 7,627,506, to Daniel Birkestrand et al., filed Jul. 10, 2003, entitled "Apparatus and Method for Providing Metered Capacity of Computer Resources," which is herein incorporated by reference. The present application is also related to commonly-assigned patent application Ser. No. 11/047,532, now abandoned to Daniel Birkestrand, entitled "Adjusting Resource Activation Based on a Manufactured Date of a Computer," which is herein incorporated by reference.

FIELD

This invention generally relates to on demand capacity for resources in a computer system and more specifically permanently activating resources based on a previous temporary resource usage.

BACKGROUND

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer resource requirements for business and government applications often increase over a time period due to sales or employee growth. Yet, over the same time period, the resource requirements may fluctuate dramatically due to the inevitable peaks and valleys of day-to-day operations or from the increased loads for seasonal, period-end, or special promotions. Thus, the peak resource requirements within a time period may be dramatically more than the valley resource requirements. Hence, in order to be effective, the computerized resources of a business must be sufficient to meet the current fluctuating needs of the business, as well as projected needs due to growth.

When faced with these fluctuating and ever-increasing resource demands, a customer conventionally needs to purchase computing resources capable of accommodating at least peak requirements while planning for future requirements, which are almost certain to be elevated. As a result, customers face the prospect of investing in more computerized resources than are immediately needed in order to accommodate growth and operational peaks and valleys, so that at a given time, the customer may have excess computing capacity, which is a very real cost. Such costs can represent a major, if not preclusive, expenditure for the customer, who may have insufficient capital or time to react to rapid growth and fluctuating requirements.

To address this problem, computing architectures such as the "capacity on demand" design, developed by International Business Machines Corporation of Armonk, N.Y., allow customers to effectively rent or lease resources, e.g., processors, on an as-needed or on-demand basis. More particularly, customers may temporarily enable standby resources that are initially dormant or unused within their machine. Where desired, the standby resources are not included in the up-front, baseline cost of the machine. As such, for a relatively smaller initial capital investment, a customer may activate and deactivate standby or on-demand resources as needed for a fee, which provides the customer with customized access and optimized usage. Thus, customers are effectively renting resources on a temporary basis.

In response to the customer deciding to permanently activate the previously-rented resources, the resource provider may wish to vary the price the customer pays for the permanently-activated resources based on the past rental usage. Thus, e.g., the resource provider may wish to charge the customer less for permanent activation if the customer has already rented the resources for a significant period of time. Hence, a current manual technique bills customers different rates for a permanent activation of a resource based on past rental use. This manual technique has the disadvantage that both the customer and the resource provider or biller are burdened by a manual process, which is imprecise and requires human intervention and associated overhead.

Thus, without a better way to handle the conversion of temporarily-activated resources to permanently-activated resources, customers, resource providers, and resource billers will continue to be burdened by a manual process.

SUMMARY

A method, apparatus, system, and signal-bearing medium are provided that, in an embodiment, determine whether an amount of usage of a resource, which is used under a temporary usage plan, exceeds a threshold. If that determination is true, a quantity of the resource is calculated and that quantity is converted from the temporary usage plan to a permanent usage plan, without further charge to the customer. In another embodiment, a different resource may be converted to the permanent usage plan than the resource that was temporarily used. In various embodiments, the calculation of the quantity is made based on an attribute of the computer that uses the resource or based on an activation code received from the provider of the resource. In various embodiments, the amount of the usage is either a time amount of use or a monetary amount charged for the resource under the temporary usage plan. In various embodiments, the quantity of the resource converted is based on a ratio of a number of permanent resources in use to a total number of resources, based on an attribute of the computer, based on the cost of the computer, based on the age of the computer, based on a speed of the resource, or based on the amount of resources in the computer.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

Figure 1:
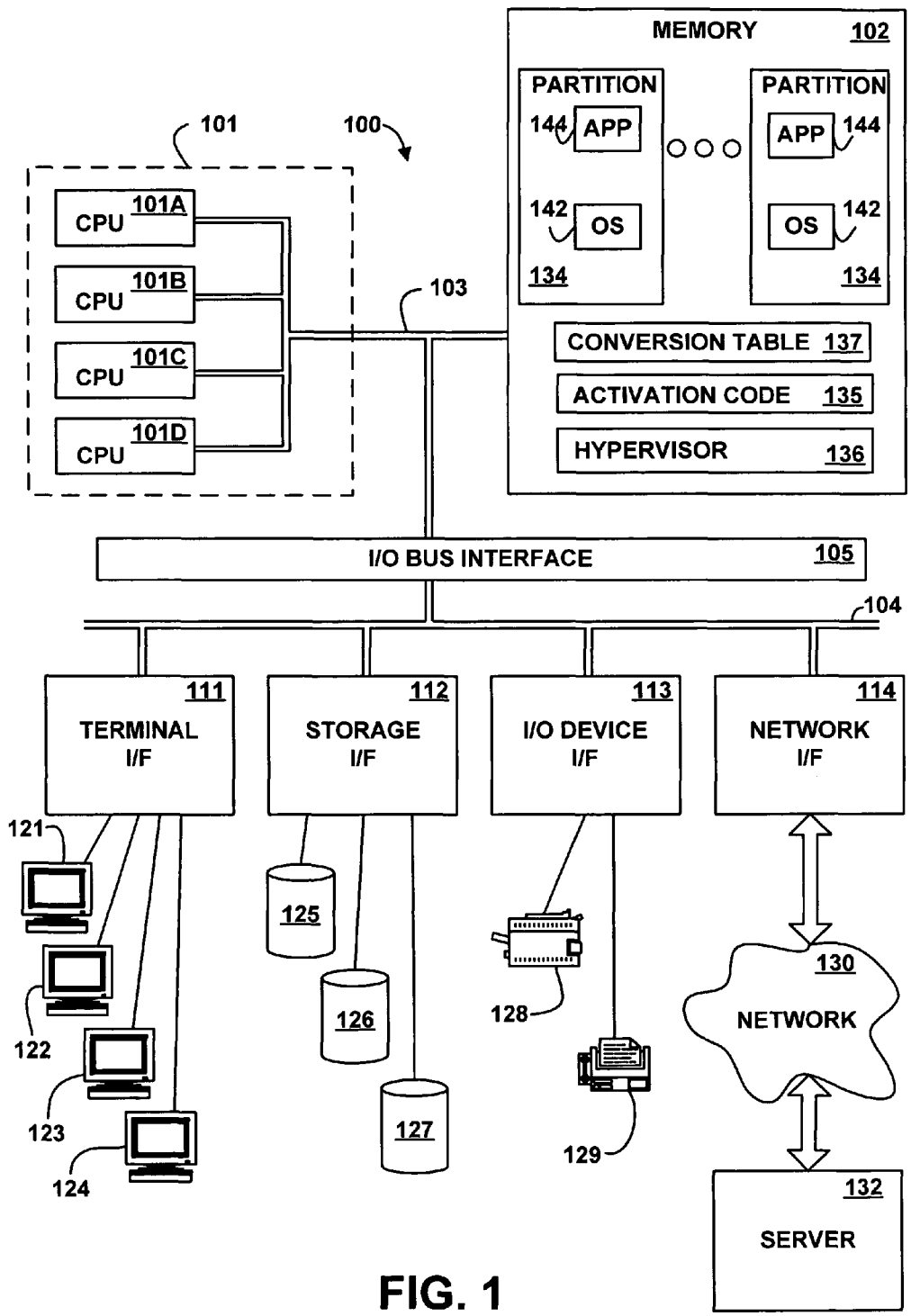
FIG. 1 depicts a high-level block diagram of an example system for implementing an embodiment of the invention.

Referring to the Drawings, wherein like numbers denote like parts throughout the several views, FIG. 1 depicts a high-level block diagram representation of a client computer system 100 connected via a network 130 to a server computer system 132, according to an embodiment of the present invention. The designations "client" and "server" are used for convenience only, and, in an embodiment, a computer that operates as a client to one computer may operate as server to another computer, and vice versa. In an embodiment, the hardware components of the computer system 100 may be implemented by an IBM eServer iSeries or pSeries computer system. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is illustrated as containing the primary software components and resources utilized in implementing a logically partitioned computing environment on the computer 100, including a plurality of logical partitions 134 managed by a partition manager or hypervisor 136, an activation code or codes 135, and optionally a conversion table 137. Although the partitions 134, the activation code 135, the hypervisor 136, and the conversion table 137 are illustrated as being contained within the memory 102 in the computer system 100, in other embodiments some or all of them may be on different computer systems, e.g., the server 132, and may be accessed remotely, e.g., via the network 130. Further, the computer system 100 may use virtual addressing mechanisms that allow the programs of the computer system 100 to behave as if they only have access to a large, single storage entity instead of access to multiple, smaller storage entities. Thus, while the partitions 134, the activation code 135, the hypervisor 136, and the conversion table 137 are illustrated as residing in the memory 102, these elements are not necessarily all completely contained in the same storage device at the same time.

Each of the logical partitions 134 utilizes an operating system 142, which controls the primary operations of the logical partition 134 in the same manner as the operating system of a non-partitioned computer. For example, each operating system 142 may be implemented using the i5OS operating system available from International Business Machines Corporation, but in other embodiments the operating system 142 may be Linux, AIX, UNIX, Microsoft Windows, or any appropriate operating system. Also, some or all of the operating systems 142 may be the same or different from each other. Any number of logical partitions 134 may be supported as is well known in the art, and the number of the logical partitions 134 resident at any time in the computer 100 may change dynamically as partitions are added or removed from the computer 100.

Each of the logical partition 134 executes in a separate, or independent, memory space, and thus each logical partition acts much the same as an independent, non-partitioned computer from the perspective of each application 144 that executes in each such logical partition. As such, user applications typically do not require any special configuration for use in a partitioned environment. Given the nature of logical partitions 134 as separate virtual computers, it may be desirable to support inter-partition communication to permit the logical partitions to communicate with one another as if the logical partitions were on separate physical machines. As such, in some implementations it may be desirable to support an unillustrated virtual local area network (LAN) adapter associated with the hypervisor 136 to permit the logical partitions 134 to communicate with one another via a networking protocol such as the Ethernet protocol. In another embodiment, the virtual network adapter may bridge to a physical adapter, such as the network interface adapter 114. Other manners of supporting communication between partitions may also be supported consistent with embodiments of the invention.

Although the hypervisor 136 is illustrated as being within the memory 102, in other embodiments, all or a portion of the hypervisor 102 may be implemented in firmware or hardware. The hypervisor 136 may perform both low-level partition management functions, such as page table management and may also perform higher-level partition management functions, such as creating and deleting partitions, concurrent I/O maintenance, allocating processors, memory and other hardware or software resources to the various partitions 134.

In an embodiment, the hypervisor 136 includes instructions capable of executing on the processor 101 or statements capable of being interpreted by instructions executing on the processor 101 to perform the functions as further described below with reference to FIG. 3 and 4. In another embodiment, the hypervisor 136 may be implemented in microcode or firmware. In another embodiment, the hypervisor 136 may be implemented in hardware via logic gates and/or other appropriate hardware techniques.

The hypervisor 136 statically and/or dynamically allocates to each logical partition 134 a portion of the available resources in computer 100. For example, each logical partition 134 may be allocated one or more of the processors 101 and/or one or more hardware threads, as well as a portion of the available memory space. The logical partitions 134 can share specific software and/or hardware resources such as the processors 101, such that a given resource may be utilized by more than one logical partition. In the alternative, software and hardware resources can be allocated to only one logical partition 134 at a time. Additional resources, e.g., mass storage, backup storage, user input, network connections, and the I/O adapters therefor, are typically allocated to one or more of the logical partitions 134. Resources may be allocated in a number of manners, e.g., on a bus-by-bus basis, or on a resource-by-resource basis, with multiple logical partitions sharing resources on the same bus. Some resources may even be allocated to multiple logical partitions at a time. The resources identified herein are examples only, and any appropriate resource capable of being allocated may be used.

The hypervisor 136 uses the activation code 135 to activate a resource or resources (previously described above) that are present at the computer system 100, but dormant or not used, so that the resource may be used and allocated to one or more of the partitions 134. In another embodiment, the partitions 134 are not present or not used, and the hypervisor 136, or other alternative function (such as an unillustrated capacity manager), uses the activation code 135 to activate a resource or resources, so that they are available for use by the entire computer system 100. In another embodiment, the hypervisor 136 or other capacity manager may activate resources for a network of connected computers.

In an embodiment, the activation code 135 is unique and configured for use only on a particular machine (e.g., the customer client computer 100), but in other embodiments the activation code 135 may be used across multiple machines. The activation code 135 may include a resource-time value. The resource-time value generally provides information that identifies a resource, optionally a quantity of that resource that is available for use, and optionally a time period for which the quantity is available for use.

As a particular example, a resource-time value may specify a number of processors and a time period for which the processors may be used. Where the time period is given in days (a day being a 24 hour period), for example, the product of these values is a number of processors-days. More generally, the resource component of a resource-time value may be any resource (e.g., of the customer client computer 100) capable of being made selectively available according to request. In addition, the quantity of the resource specified by the activation code 135 may be a whole number or a fraction.

The hypervisor 136 may optionally verify the activation code 135 to determine if the activation code 135 is configured for the machine(s) for which the hypervisor 136 has responsibility. The hypervisor 136 then activates (enables or unlocks) the selected resource or resources associated with the activation code 135.

In an embodiment, activating resources by the hypervisor 136 operates to place the resources into service (i.e., to perform their designated functions such as processing or storing, depending upon the resource), optionally for a period of time. In another embodiment, activating the resources does not place the resources into service, but merely makes the resources available for request by a user. That is, activating the resources unlocks the resources, so that a user can assign them a task, but does not automatically give control of the resources to the operating system(s) 142. In this respect, the user may be given flexibility in the manner in which the resource-time value is used. For example, the resource-time value may define a usage limit which may be reached by specifying any variety of resource quantity values and time values, so long as the sum of the products of the specified quantity values and time values does not exceed the usage limit. In this way, multiple resource requests may be made for capacity based on a single enablement code, so long as the sum of the products of the specified quantity values and time values is equal to or less than the usage limit value specified by the resource-time value of a particular enablement code.

Regardless of the manner in which resources are placed into service, the duration for which the resources are in use (or at least available to be used if needed during continued operation of the system) may be permanent or temporary, according to a specified time limit. Once the specified time limit expires, the hypervisor 136 reclaims the temporary resources and deactivates or disables them from further use. Of course, the same resources may be re-activated at a later time.

The hypervisor 136 uses the conversion table 137 to determine a conversion rate to convert temporarily-activated resources to permanently-activated resources, as further described below with reference to FIG. 4. In another embodiment, the conversion table 137 is optional, not present, or not used, and the hypervisor 136 uses information in the activation code 135 to convert temporarily-activated resources to permanent resources, as further described below with reference to FIG. 4.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiments many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100 and the server 132. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The server 132 generates the activation code 135 and provides it to the hypervisor 136. The server 132 is further described below with reference to FIG. 2. In another embodiment, the hypervisor 136 generates the activation code 135, and the server 132 is optional, not present, or not used.

FIG. 1 is intended to depict the representative major components of the computer system 100, the network 130, and the server 132 at a high level; individual components may have greater complexity than represented in FIG. 1; components other than or in addition to those shown in FIG. 1 may be present; and the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 and the server 132 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
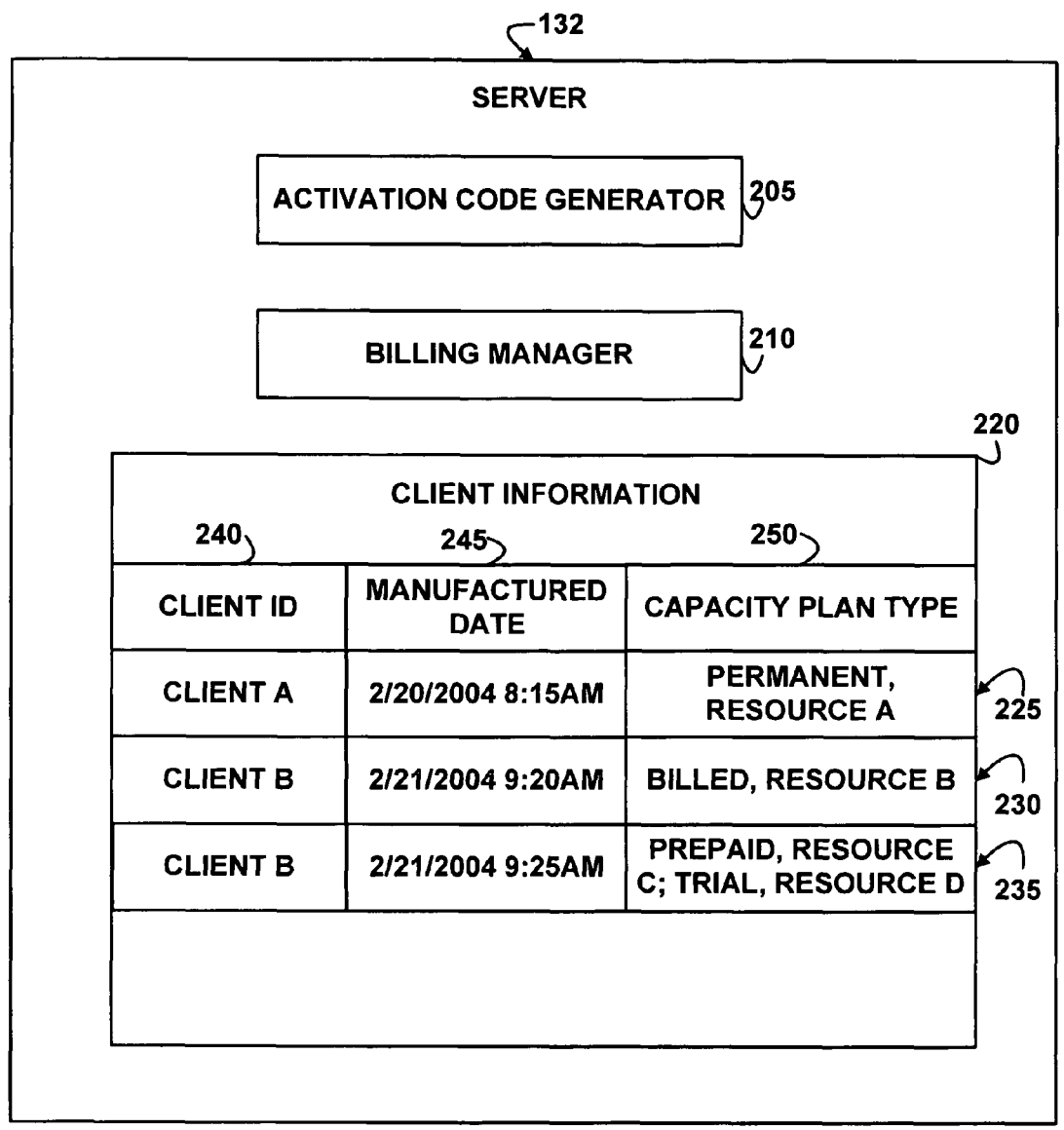
FIG. 2 depicts a block diagram of an example server, according to an embodiment of the invention.

FIG. 2 depicts a block diagram of the server 132, according to an embodiment of the invention. The server 132 may be associated with a manufacturer of the computer system 100, associated with a provider of resources to the computer system 100, or associated with a service company that bills for resources used by the computer system 100. While aspects of the invention are described in the context of a business, the invention provides advantages to any user, whether involved in a business or not.

The server 132 includes an activation code generator 205, a billing manager 210, and client information 220. The server 132 may further include any or all of the hardware and software elements previously described above for the computer system 100 with reference to FIG. 1. Although FIG. 2 illustrates the activation code generator 205, the billing manager 210, and the client information 220 being present at the server 132, in other embodiments some or all of them may be present at the client 100. For example, in an embodiment, some or all of them may be combined with or packaged with the hypervisor 136 of the client 100.

The activation code generator 205 generates the activation code 135, as further described below with reference to FIGS. 3 and 4. The billing manager 210 stores on demand plan types in records in the client information 220. The billing manager 210 is further described below with reference to FIG. 3.

In an embodiment, the activation code generator 205, and the billing manager 210 may include instructions capable of executing on a processor or statements capable of being interpreted by instructions executing on a processor analogous to the processor 101 of FIG. 1. In another embodiment, the activation code generator 205, and the billing manager 210 may be implemented in microcode or firmware. In another embodiment, the activation code generator 205, and/or the billing manager 210 may be implemented in hardware via logic gates and/or other appropriate hardware techniques.

The client information 220 includes records 225, 230, and 235, but in other embodiments any number of records with any appropriate data may be present. Each of the records 225, 230, and 235 includes a client identifier field 240, a manufactured date field 245, and a capacity plan type field 250. The client identifier field 240 identifies the computer (e.g., the client 100) or other electronic device associated with the record and may indicate a serial number or other identifier. In various embodiments, the manufactured date field 245 indicates the date that the associated computer or resource, such as the client computer 100, was manufactured, placed into service, or sold to the customer. The capacity plan type field 250 indicates the type of on-demand capacity plan in which the customer associated with the client identifier 240 is enrolled and optionally the resources associated with the plan. Illustrated are plan types of permanent, billed, prepaid, and trial.

Under the permanent plan (also known as capacity upgrade on demand), the customer associated with the client identifier 240 has purchased the permanent use of a resource identified in the capacity plan type 250, which the client 100 may make use of as needed with no time limit. Since the customer has permanently purchased the resource, the customer does not pay less if the resource is idle and not actually used by the client 100. Further, the resource may be shared among the partitions 134 (if present) as needed, as controlled by the hypervisor 136. Thus, the permanent plan is analogous to a customer purchasing a car, which the customer may drive when needed or may keep in the garage when not needed. If the car is in the garage and not used, the customer has still paid for the car. Also, the car may be shared among family members.

Under the billed on/off capacity on demand plan, which is a temporary plan, the use of the resource is monitored, so that the customer pays only if (or is billed if) the resource is made available via a customer request. Further, the resource may be shared among the partitions 134 (if present) as needed, as controlled by the hypervisor 136. Thus, the temporary plan is analogous to a customer renting a movie DVD. Billing occurs regardless of actual use for designated time periods (each day) that the movie is not returned.

Under the prepaid capacity on demand plan (also called a reserve plan), which is a temporary plan, the customer at the client 100 purchases use of a resource identified in the capacity plan 250 for a time period (e.g., a purchase of a certain number of processor-hours), the client 100 may use that resource when needed for that amount of time, and the hypervisor 136 may further allocate the resource and its purchased time among the partitions 134 (if present) as needed. When the time period has been consumed, the client 100 loses use of the resource unless and until the customer purchases additional time. Thus, the reserve plan is analogous to a customer buying a tank-full (or any portion thereof) of gas for a car. Once the customer has bought the gas, the customer may use it until it is gone. If the customer parks the car in the garage temporarily and does not drive it, the gas is still in the tank and may be consumed at a later date when needed. Once the tank of gas is gone, the customer may purchase more if needed. Further, the gas may be allocated among various family members when they drive the car.

Under the trial plan, the customer receives free use of the resource for a period of time. In various embodiments, the trial plan may be identical to either the billed or paid plans except that the customer is not billed for or has not paid for, respectively, use of the resource.

Figure 3:
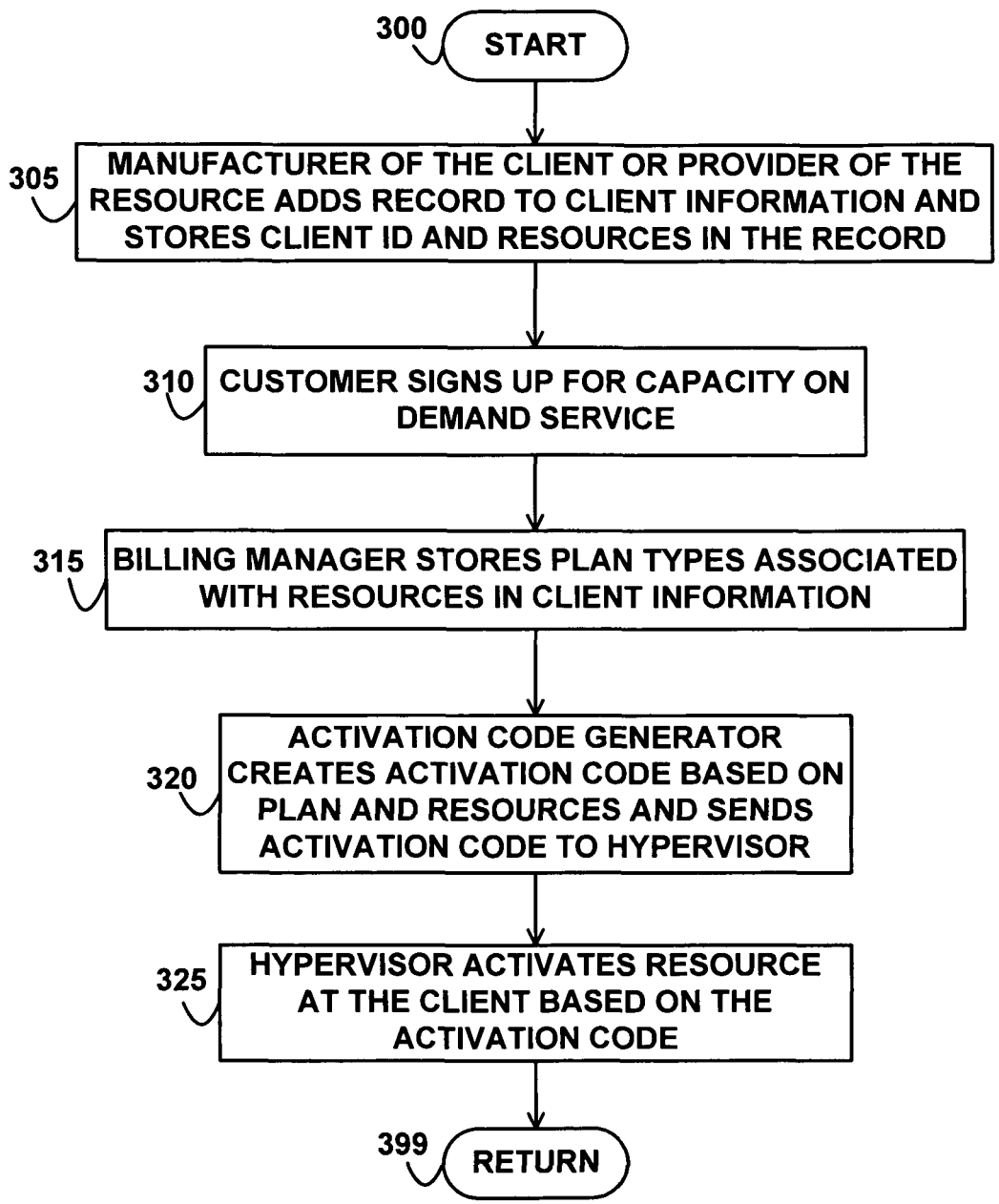
FIG. 3 depicts a flowchart of example processing for activating a resource, according to an embodiment of the invention.

FIG. 3 depicts a flowchart of example processing for activating a resource, according to an embodiment of the invention. Control begins at block 300. Control then continues to block 305 where the manufacturer of the client 100 or the provider of a resource at the client 100 adds a record, such as one of the records 225, 230, or 235, to the client information 220 and stores the client identifier and resources in the record.

Control then continues to block 310 where the customer signs up for a type (e.g., permanent, billed, prepaid, or trial as previously described above with reference to FIG. 3) of capacity on-demand service for a resource or resources. Control then continues to block 315 where the billing manager 210 stores the plan type and the associated resources in the client information 220. Control then continues to block 320 where the activation code generator 205 creates an activation code 135 based on the plan type and resources and sends the activation code 135 to the hypervisor 136. In an embodiment, the activation code generator 205 sends the activation code 135 electronically to a client mail application (unillustrated) residing on the customer client computer 100. In yet another alternative, the activation code 135 is provided to the user (e.g., administrator) of the customer client computer 100 via paper mail (i.e., the postal service) or facsimile, for example. In another embodiment, the activation code generation and interpretation take place within the client computer 100 based on the client information 220 known to the hypervisor 136.

Control then continues to block 325 where the hypervisor 136 activates a resource at the client 100 based on the activation code 135 either permanently or temporarily and either immediately or later as needed. Control then continues to block 399 where the logic of FIG. 3 returns.

Figure 4:
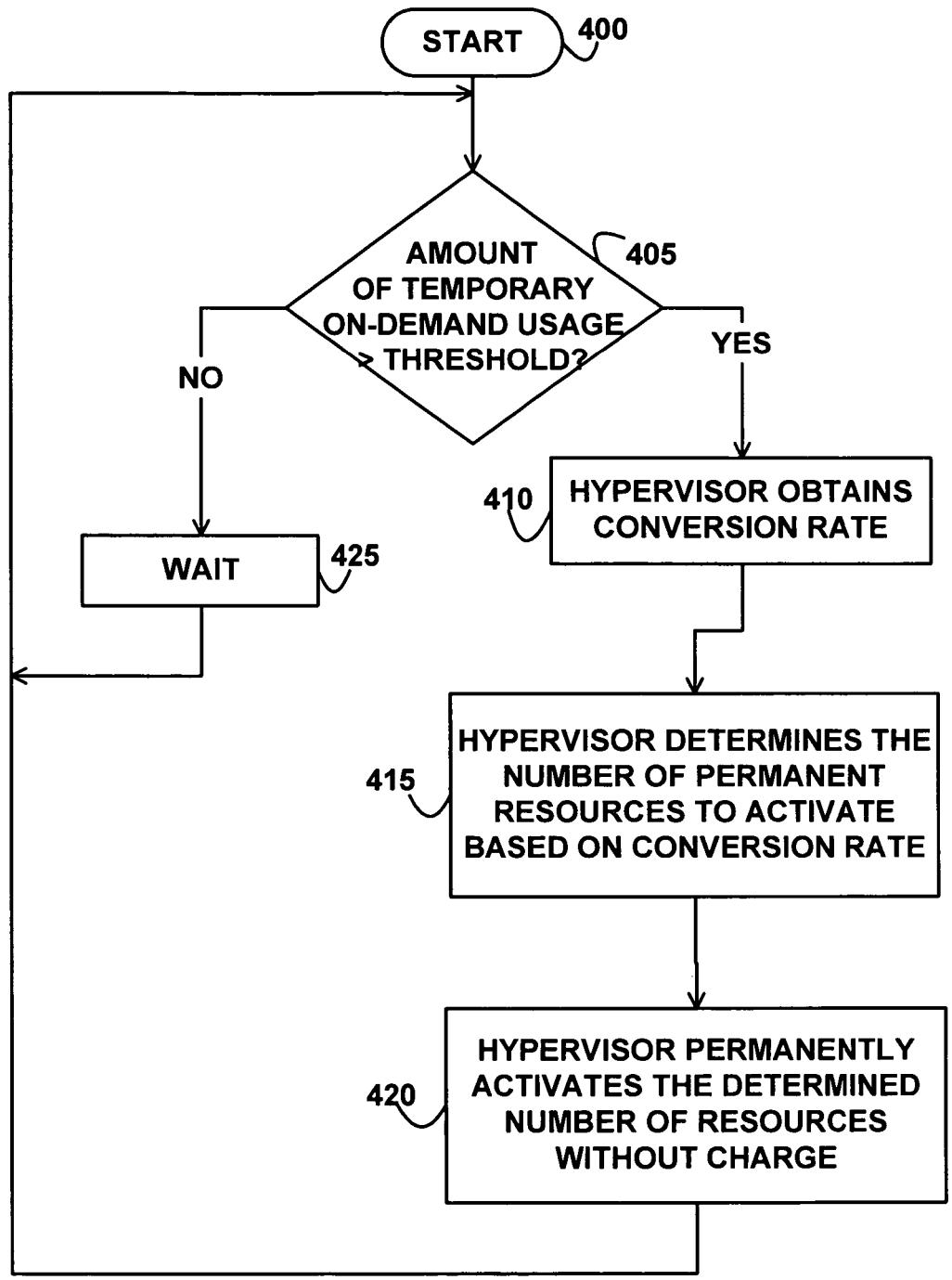
FIG. 4 depicts a flowchart of example processing for permanently activating resources based on previous temporary resource usage, according to an embodiment of the invention.

FIG. 4 depicts a flowchart of example processing for permanently activating resources based on previous temporary resource usage, according to an embodiment of the invention. Control begins at block 400. Control then continues to block 405 where the hypervisor 136 determines whether the amount of on-demand usage for a resource or resources at the computer 100 enrolled in a temporary capacity on-demand plan (e.g., the billed or prepaid plans) is greater than a threshold. In various embodiments, the hypervisor 136 may keep track of the usage of the temporary resources or may request usage data from the billing manager 210 at the server 132. Resources enrolled in a temporary capacity on-demand plan are referred to herein as temporarily-activated resources, regardless of whether they are actually in use or merely available for use at the time of the determination at block 405. In various embodiments, the amount of on-demand usage may be expressed in resource-time (e.g., processor-days) or amount of money charged, billed, or paid for the temporary resource use. In various embodiments, the threshold may be fixed or variable and may be based on the type and/or number resources at the computer 100, and/or the type of on-demand capacity plan.

If the determining at block 405 is true, then the amount of on-demand usage is greater than the threshold, so control continues to block 410 where the hypervisor 136 obtains a conversion rate. In an embodiment, the hypervisor 136 uses the conversion table 137 to obtain the conversion rate. The conversion table 137 may be unique to the computer 100 and varies by system type, features, characteristics, or attributes, such as the amount of resources (memory, processors, attached devices, or any other resource) in the computer 100, the original price of the computer 100, or any other appropriate attribute. The conversion table 137 defines the conversion rate from a temporary to permanent resource. Using the conversion table 137, the hypervisor 136 may perform a real-time conversion from a temporary resource to a permanent resource because the hypervisor 136 does not need to wait for the user to enter the activation code 135 or wait to receive the activation code 135 from the server 132 to begin the conversion process. In an embodiment, the table conversion 137 is faxed at manufacture of the computer 100 and is not later modified by the resource provider. But, in another embodiment, the resource provider, e.g., via the server 132, may periodically send a new or updated conversion table 137 to the hypervisor 136.

In another embodiment, the hypervisor 136 uses information contained in the activation code 135 supplied by the resource provider to use for the conversion rate from the temporary to the permanent resource. Using the activation code 135 allows the resource provider to vary the conversion based on a number of factors, such as the age of the machine or marketing pressures subsequent to the initial shipping of the resource or the computer 100. But, this embodiment does not necessarily allow a real-time conversion since the resource provider must send the activation code 135 to the computer 100, e.g., from the server 132.

In another embodiment, the hypervisor 136 determines the conversion rate based on some or all of the following factors. A first factor is the ratio of the number of permanent resources (processors or any other resource) in use so far to the total resources (both active and inactive). The throughput of the computer 100 decreases in proportion to the number of processors added, so the amount of resources permanently converted can increase each time as determined by the hypervisor 136. A second factor is the size or cost of the computer 100. A large machine may offer a lesser or greater rate of conversion than a smaller machine since they are marketed differently. A third factor is the age and/or depreciation of the computer 100. The value of temporary usage of resources may decrease over time when compared to the potential of buying a new computer with better price/performance. Thus, the hypervisor 136 may grant more free permanent resources in proportion to the age or depreciation of the machine. A fourth factor is the speed of the processor 101 in the computer 100. A fifth factor is the amount or quantity of the memory 102 or other resources in the computer 100. A sixth factor is marketing offers/special promotions.

Control then continues to block 415 where the hypervisor 136 determines the number or amount of permanent resources to activate at the computer 100 based on the conversion rate. In an embodiment, the hypervisor 136 divides the temporary usage by the conversion rate to find the permanent resource activation. For example, if the conversion rate is eight, and the temporary resource usage is expressed in processor-days, then the hypervisor 136 divides the temporary resource usage by eight to obtain the number of permanent processors to activate for free. Thus, if the temporary resource usage is sixteen processor days, the hypervisor 136 divides sixteen by eight to yield two permanent processors to activate without further charge. Hence, for every eight processor-days of temporary usage, the hypervisor 136 grants the customer associated with the computer 100 one full permanent processor without charge and then charges the customer for any remaining permanent processors that the customer desires. The numbers illustrated are examples only, and in other embodiments any appropriate numbers may be used.

Control then continues to block 420 where the hypervisor 136 permanently activates the determined number of resources at the computer 100 without further charge to the customer associated with the computer 100. Thus, the hypervisor 136 converts the determined quantity of the resource from the temporary usage plan to the permanent usage plan. In another embodiment, the permanently-activated resources may be on a different computer from the temporarily-activated resource, e.g., attached via the network 130. In an embodiment, the permanently-activated resource may be the same resource as the resource that was previously temporarily activated. In another embodiment, they may be different resources. For example, the temporarily-activated resource may be memory while the permanently-activated resource may be a processor, but in other embodiments any appropriate resources and combination may be used. Control then returns to block 405, as previously described above.

If the determination at block at block 405 is false, then the amount of on-demand usage is not greater than the threshold, so control continues to block 425 where the hypervisor 136 waits for a period of time before returning to block 405, as previously described above.

Although the logic of FIG. 4 has been described as being performed by the hypervisor 136 at the computer 100, in another embodiment, the logic of FIG. 4 may be performed at the server 132, e.g., by the billing manager 210, which sends the activation code 135 to the hypervisor, which activates the permanent resources based on the activation code.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
   receiving an activation code at a computer, wherein the activation code identifies a resource at the computer, a quantity of the resource that is available for use by the computer, and a time period for which the quantity of the resource is available for use by the computer, wherein the activation code is stored at the computer;
   temporarily activating the resource at the computer under a temporary usage plan based on the activation code, wherein a customer pays for use of the resource by the computer under the temporary usage plan;
   determining whether an amount of usage of the resource by the computer under the temporary usage plan exceeds a threshold;
   if the amount of the usage of the resource by the computer under the temporary usage plan exceeds the threshold, calculating a quantity of the resource, converting the quantity of the resource from the temporary usage plan to a permanent usage plan, and permanently activating the resource for use by the computer without further charge to the customer;
   wherein the calculating the quantity is based on an attribute of the computer that uses the resource; and
   wherein the amount of the usage comprises a time amount that the computer used the resource under the temporary usage plan.

2. The method of claim 1, wherein the calculating the quantity is based on the activation code received from a provider of the resource.

3. The method of claim 1, wherein the amount of the usage comprises the time period that the resource was available for use by a computer under the temporary usage plan.

4. The method of claim 1, wherein the amount of the usage comprises a monetary amount charged for the resource under the temporary usage plan.

5. A computer-readable storage medium encoded with instructions, wherein the instructions when executed comprise:
   receiving an activation code at a computer, wherein the activation code identifies a resource at the computer, a quantity of the resource that is available for use by the computer, and a time period for which the quantity of the resource is available for use by the computer, wherein the activation code is stored at the computer;
   temporarily activating the resource at the computer under a temporary usage plan based on the activation code, wherein a customer pays for use of the resource by the computer under the temporary usage plan;
   determining whether an amount of usage of the resource by the computer under the temporary usage plan exceeds a threshold;
   if the amount of the usage of the resource by the computer under the temporary usage plan exceeds the threshold, calculating a quantity of the resource, converting the quantity of the resource from the temporary usage plan to a permanent usage plan, and permanently activating the resource for use by the computer without further charge to the customer;
   wherein the calculating the quantity is based on an attribute of the computer that uses the resource; and
   wherein the amount of the usage comprises a time amount that the computer used the resource under the temporary usage plan.

6. The computer-readable storage medium of claim 5, wherein the calculating the quantity is based on the activation code received from a provider of the resource.

7. The computer-readable storage medium of claim 5, wherein the first resource and the second resource are identical resources.

8. The computer-readable storage medium of claim 5, wherein the first resource and the second resources are different resources.

9. The computer-readable storage medium of claim 5, wherein the amount of the usage comprises a monetary amount charged for the resource under the temporary usage plan.

10. The computer-readable storage medium of claim 5, wherein the calculating the quantity further comprises:
    calculating a ratio of a number of permanent resources in use to a total number of resources.

11. A method for configuring a computer, comprising:
    configuring the computer to receive an activation code at a computer, wherein the activation code identifies a resource at the computer, a quantity of the resource that is available for use by the computer, and a time period for which the quantity of the resource is available for use by the computer, wherein the activation code is stored at the computer;
    configuring the computer to temporarily activate the resource at the computer under a temporary usage plan based on the activation code, wherein a customer pays for use of the resource by the computer under the temporary usage plan;
    configuring the computer to determine whether an amount of usage of the resource by the computer under the temporary usage plan at the computer exceeds a threshold;
    configuring the computer to calculate a quantity of the resource, convert the quantity of the resource from the temporary usage plan to a permanent usage plan, and permanently activating the resource for use by the computer without further charge to the customer if the amount of the usage by the computer under the temporary usage plan exceeds the threshold;
    wherein the configuring the computer to calculate the quantity is based on an attribute of the computer that uses the resource; and
    wherein the amount of the usage comprises a time amount that the computer used the resource under the temporary usage plan.

12. The method of claim 11, wherein the configuring the computer to calculate the quantity is based on a cost of the computer.

13. The method of claim 11, wherein the configuring the computer to calculate the quantity is based on an age of the computer.

14. The method of claim 11, wherein the configuring the computer to calculate the quantity is based on a speed of the resource.

15. The method of claim 11, wherein the configuring the computer to calculate the quantity is based on an amount of the resource in the computer.

* * * * *